(12) United States Patent
Jiang et al.

(10) Patent No.: US 8,929,456 B2
(45) Date of Patent: Jan. 6, 2015

(54) VIDEO CODING USING COMPRESSIVE MEASUREMENTS

(75) Inventors: Hong Jiang, Warren, NJ (US); Kim Matthews, Watchung, NJ (US); Paul Wilford, Bernardsville, NJ (US); Chengbo Li, Houston, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 423 days.

(21) Appl. No.: 12/894,757

(22) Filed: Sep. 30, 2010

(65) Prior Publication Data

US 2012/0082207 A1   Apr. 5, 2012

(51) Int. Cl.
| | | |
|---|---|---|
| *H04N 7/30* | (2006.01) | |
| *H04N 19/90* | (2014.01) | |
| *H04N 19/19* | (2014.01) | |
| *H04N 19/44* | (2014.01) | |
| *H04N 19/169* | (2014.01) | |
| *H04N 19/30* | (2014.01) | |

(52) U.S. Cl.
CPC ... *H04N 19/00945* (2013.01); *H04N 19/00351* (2013.01); *H04N 19/00533* (2013.01); *H04N 19/00254* (2013.01); *H04N 19/00424* (2013.01)
USPC .............. 375/240.2; 375/240.24; 375/240.01; 375/E7.226; 375/E7.026

(58) Field of Classification Search
None
See application file for complete search history.

(56) References Cited

U.S. PATENT DOCUMENTS

| | | | |
|---|---|---|---|
| 3,775,602 A | 11/1973 | Alexandridis et al. | |
| 5,070,403 A | 12/1991 | Wilkinson | |
| 5,166,788 A | 11/1992 | Lee | |
| 5,262,854 A * | 11/1993 | Ng | 375/240.24 |
| 5,555,023 A | 9/1996 | Maenaka et al. | |
| 5,572,552 A | 11/1996 | Dent et al. | |
| 5,870,144 A | 2/1999 | Guerrera | |
| 5,983,251 A | 11/1999 | Martens et al. | |
| 6,148,107 A * | 11/2000 | Ducloux et al. | 382/236 |
| 6,356,324 B1 * | 3/2002 | Nishiguchi et al. | 349/117 |
| 6,718,287 B2 | 4/2004 | Oostveen et al. | |
| 7,345,603 B1 | 3/2008 | Wood et al. | |
| 7,680,356 B2 | 3/2010 | Boyce et al. | |

(Continued)

FOREIGN PATENT DOCUMENTS

| | | |
|---|---|---|
| WO | WO 2009/007580 | 1/2009 |
| WO | WO 2009007580 A2 * | 1/2009 |

OTHER PUBLICATIONS

Dugad, R. et al.; "A fast scheme for image size change in the compressed domain"; Apr. 2001; Circuits and Systems for Video Technology, IEEE Transactions on; vol. 11, Issue 4; pp. 461-474.*

(Continued)

*Primary Examiner* — Christopher S Kelley
*Assistant Examiner* — Kaitlin A Retallick
(74) *Attorney, Agent, or Firm* — Harness, Dickey & Pierce

(57) ABSTRACT

The present invention relates to an apparatus and method for video coding using compressive measurements. The method includes receiving video data including frames, and determining at least one temporal structure based on a series of consecutive frames in the video data. The temporal structure includes a sub-block of video data from each frame in the series. The method further includes obtaining a measurement matrix, and generating a set of measurements by applying the measurement matrix to the at least one temporal structure. The measurement matrix includes an assigned pattern of pixel values and the set of measurements is coded data representing the at least one temporal structure.

28 Claims, 12 Drawing Sheets

(56) References Cited

U.S. PATENT DOCUMENTS

| | | | |
|---|---|---|---|
| 8,125,883 | B2 | 2/2012 | Aulin |
| 8,204,126 | B2 | 6/2012 | Tsuda et al. |
| 2003/0043918 | A1 | 3/2003 | Jiang et al. |
| 2003/0197898 | A1 | 10/2003 | Battiato et al. |
| 2004/0264580 | A1 | 12/2004 | Chiang Wei Yin et al. |
| 2005/0207498 | A1* | 9/2005 | Vitali et al. ............. 375/240.16 |
| 2006/0203904 | A1* | 9/2006 | Lee ........................... 375/240.1 |
| 2006/0239336 | A1 | 10/2006 | Baraniuk et al. |
| 2007/0242746 | A1 | 10/2007 | Kishimoto et al. |
| 2007/0285554 | A1* | 12/2007 | Givon ......................... 348/340 |
| 2008/0025624 | A1* | 1/2008 | Brady .......................... 382/238 |
| 2008/0117968 | A1* | 5/2008 | Wang ...................... 375/240.12 |
| 2008/0130883 | A1 | 6/2008 | Agaian et al. |
| 2008/0152296 | A1* | 6/2008 | Oh et al. ......................... 386/47 |
| 2009/0052585 | A1* | 2/2009 | Song et al. .................... 375/340 |
| 2009/0222226 | A1 | 9/2009 | Baraniuk et al. |
| 2009/0316779 | A1 | 12/2009 | Fukuhara et al. |
| 2010/0027897 | A1 | 2/2010 | Sole et al. |
| 2010/0091134 | A1* | 4/2010 | Cooke et al. ............... 348/229.1 |
| 2010/0165163 | A1 | 7/2010 | Matsuda |
| 2010/0189172 | A1* | 7/2010 | Pateux et al. ............ 375/240.01 |
| 2010/0246952 | A1 | 9/2010 | Banner et al. |
| 2011/0150084 | A1 | 6/2011 | Choi et al. |
| 2011/0150087 | A1* | 6/2011 | Kim et al. ................ 375/240.12 |
| 2011/0276612 | A1 | 11/2011 | Droz et al. |
| 2012/0051432 | A1 | 3/2012 | Fernandes et al. |
| 2012/0082208 | A1* | 4/2012 | Jiang et al. ................. 375/240.2 |
| 2012/0189047 | A1 | 7/2012 | Jiang et al. |

OTHER PUBLICATIONS

Dugad, R. et al.; "A fast scheme for image size change in the compressed domain"; Apr. 2001 Circuits and Systems for Video Technology, IEEE Transactions on; vol. 11, Issue 4; pp. 461-474.*
Cossalter, M. et al.; "Joint Compressive Video Coding and Analysis"; Apr. 2010; Multimedia, IEEE Transactions on; vol. 12, No. 3; pp. 168-183.*
Robucci, Ryan, et al., "Compressive Sensing on a CMOS Seperable Transform Image Sensor," pp. 5125-5128, IEEE, 2008.
International Search Report and Written Opinion for PCT/US2011/051730 dated Dec. 15, 2011.
CCD and CMOS sensor technology, 2010, Axis Communications, pp. 1-8.
Jan Bogaerts et al., High-End CMOS Active Pixel Sensors for Space-Borne Imaging Instruments, 2005, FillFactory, pp. 1-9.
Roger William Doering, A Tricolor-Pixel Digital-Micromirror Video Chip, 2001, UCLA, pp. 1-180.
Tarek Ouni et al., New low complexity DCT based video compression method, 2009, IEEE 09, pp. 202-207.
R. Turchetta et al., Monolithic active pixel sensors (MAPS) in a VLSI CMOS technology, 2003, Science Direct, pp. 251-259.
Sahng-Gyu Park, Adaptive Lossless Video Compression, 2003, Purdue University, pp. 1-105.
Office Action dated Oct. 1, 2012 for U.S. Appl. No. 12/894,855.
Office Action dated Nov. 21, 2012 for U.S. Appl. No. 12/894,807.
Dugad, R. et al., "A Fast Scheme for Image Size Change in the Compressed Domain," IEEE Transactions on Circuits and Systems for Video Technology, vol. 11, No. 4, Apr. 1, 2011.
Deng, C. et al., "Robust image compression based on compressive sensing," Multimedia and Expo (ICME), Jul. 19, 2012, pp. 462-467.
Hyder, M. et al., "A Scalable Distributed Video Coder Using Compressed Sensing," India Conference, Dec. 8, 2009, pp. 1-4.
Gao, D. et al., "A Robust Image Transmission Scheme for Wireless Channels Based on Compressive Sensing," Aug. 18, 2012, pp. 334-341.
International Search Report dated Feb. 29, 2012.
Cossalter M. et al., "Joint Compressive Video Coding and Analysis," IEEE Transactions on Multimedia, IEEE Service Center, Piscataway, NJ, US, vol. 12, No. 3, Apr. 1, 2010, pp. 168-183, XP011346672.
Dadkhan M.R. et al., "Compressive Sensing with Modified Total Variation Minimization Algorithm," Acoustic Speech and Signal Processing (ICASSP), 2010 IEEE International Conference On, IEEE, Piscataway, NJ, USA, Mar. 14, 2010, pp. 1310-1313, XP031697373.
Huihui Bai et al., "Compressive Sensing for DCT Image," Computational Aspects of Social Networks (CASON), 2010 International Conference On, IEEE, Piscataway, NJ, USA, Sep. 26, 2010, pp. 378-381, XP031802282.
Duarte M.F. et al., "Single-Pixel Imaging via Compressive Sampling," IEEE Signal Processing Magazine, IEEE Service Center, Piscataway, NJ, US, vol. 25, No. 2, Mar. 1, 2008, pp. 83-91, XP011225667.
Chengbo Li, "An Efficient Algorithm for Total Variation Regularization with Applications to the Single Pixel Camera and Compressive Sensing," Thesis Submitted in Partial Fulfillment of the Requirements for the Degree Master of Arts, Sep. 30, 2009, pp. 1-93, XP55010819, Retrieved from the internet: URL:http://scholarship.rice.edu/bitstream/handle/1911/62229/1486057.PDF?sequence=1 [Retrieved Oct. 31, 2011].
Chengbo Li et al., "Video Coding Using Compressive Sensing for Wireless Communications," Wireless Communications and Networking Conference (WCNC), 2011 IEEE, IEEE, Mar. 28, 2011, pp. 2077-2082, XP031876593.
Hong Jiang et al., "Arbitrary Resolution Video Coding Using Compressive Sensing," Workshop on Picture Coding and Image Processing 2010, Dec. 7, 2010 XP030082080.
International Search Report dated Nov. 14, 2011 for Application No. PCT/US2011/051726.
Park and Wakin, "A multiscale framework for compressive sensing of video," in Picture Coding Simposium, Chicago, IL, May 2009.
Drori, Iddo, "Compressed Video Sensing", BMVA symposium on 3D video analysis, display, and applications, 2008.
Wakin et al., "Compressive imaging for video representation and coding", in Picture Coding Symposium, (Beijing, China), Apr. 2006.
U.S. Office Action dated Mar. 4, 2013, for U.S. Appl. No. 12/894,855.
International Preliminary Report on Patentability and Written Opinion of the International Searching Authority for PCT/US2011/051726 dated Apr. 11, 2013.
International Preliminary Report on Patentability and Written Opinion of the International Searching Authority for PCT/US2011/051730 dated Apr. 11, 2013.
International Preliminary Report on Patentability and Written Opinion of the International Searching Authority for PCT/US2011/056088 dated Apr. 11, 2013.
Office Action for corresponding U.S. Appl. No. 12/894,807 dated May 13, 2013.
Office Action for corresponding U.S. Appl. No. 13/182,856 dated Aug. 16, 2013.
Office Action dated Feb. 13, 2014, in related U.S. Appl. No. 13/182,856.
Office Action dated Apr. 14, 2014, in related U.S. Appl. No. 12/894,807.
Office Action for corresponding U.S. Appl. No. 13/213,743 dated Jun. 18, 2014.
Office Action dated Jul. 9, 2014, in related U.S. Appl. No. 13/213,762.
Translation of Japanese Office Action dated Feb. 25, 2014 issued in JP Application No. 2013-531633.
Office Action for corresponding U.S. Appl. No. 12/894,807 dated Oct. 24, 2014.

* cited by examiner ing resources. For example, a video source may be transmitted through the video network to a high performance computer with high resolution monitors in a residential home, and at the same time, to a mobile device with a low resolution screen and with a battery powered CPU. Therefore, it is desirable for a video source to be encoded in such a way that the same encoded video stream can be transmitted, and be usable by all clients, of different, characteristics, in the network. In other words, it is desirable to encode the video source once, but to transmit the same encoded video at different channel rates, and to decode it at different resolutions, and with different complexities.

VIDEO CODING USING COMPRESSIVE MEASUREMENTS

BACKGROUND

In a video network, a video source may be transmitted to multiple client devices with different characteristics. The client devices in the video network may have different channel capacities, different display resolutions, and different computing resources. For example, a video source may be transmitted through the video network to a high performance computer with high resolution monitors in a residential home, and at the same time, to a mobile device with a low resolution screen and with a battery powered CPU. Therefore, it is desirable for a video source to be encoded in such a way that the same encoded video stream can be transmitted, and be usable by all clients, of different, characteristics, in the network. In other words, it is desirable to encode the video source once, but to transmit the same encoded video at different channel rates, and to decode it at different resolutions, and with different complexities.

Traditional video coding such as MPEG2 does not provide the scalability desired for today's video network as described above. The lack of scalability exhibits itself in at least two ways. First, an MPEG2 encoded video is not scalable with transmission channel capacity. Because of its fixed bit rate, an encoded MPEG2 stream is unusable in a channel supporting a lower bit rate, and at the same time, suboptimal in a channel with higher bit rate. This is the cause of the cliff effect encountered in video broadcast or multicast. Second, the MPEG2 video is not scalable with decoder resolution or decoding complexity. An MPEG2 video can be decoded only at one resolution, with a fixed complexity (not considering post-processing such as resizing, or enhancement, after decoding). This creates the need for multiple encoded streams of the same video content to target decoders of different resolutions and different decoding complexity.

Efforts have been made to introduce scalability into video coding. However, these conventional efforts encode video data into ordered layers, or levels, of streams, and the resolution, or quality, of the decoded video increases progressively as higher layers, or levels, are added to the decoder. Hierarchical modulation may be used in conjunction with these scalable video codes to achieve more bandwidth efficiency. For example, the high priority of hierarchical modulation can be used to carry the lower layer video streams, and low priority of hierarchical modulation can be used to carry the higher layer of video streams. These efforts have provided some alleviation to problems such as the cliff effect in video transmission using the traditional video coding, but challenges of mobile video broadcast still remain.

SUMMARY

The present invention relates to an apparatus and method for video coding using compressive measurements.

The method includes receiving video data including frames, and determining at least one temporal structure based on a series of consecutive frames in the video data. The temporal structure includes a sub-block of video data from each frame in the series. The method further includes obtaining a measurement matrix, and generating a set of measurements by applying the measurement matrix to the at least one temporal structure. The measurement matrix includes an assigned pattern of pixel values and the set of measurements is coded data representing the at least one temporal structure.

The determining step may further include extracting the sub-block of video data from a same location in each of the frames in the series, and forming the temporal structure based on the extracted sub-blocks.

In another embodiment, the determining step may further include extracting the sub-block of video data from a different location in at least one frame of the series, and forming the temporal structure based on the extracted sub-blocks, where the extracted sub-blocks represents a motion trajectory of an object.

The measurement matrix may be represented by a set of measurement bases, where each measurement basis in the set of measurement bases has a same determined temporal structure of the video data. The measurement matrix may be a randomly permutated Walsh-Hadamard matrix.

The generating step may further include scanning pixels of the temporal structure to obtain a one-dimensional (1-D) vector, where the 1-D vector includes pixel values of the temporal structure, and multiplying the 1-D vector by each column of the measurement matrix to generate the set of measurements. The 1-D length of the vector is based on a number of horizontal and vertical pixels in one frame and the number of consecutive frames in the series.

Embodiments of the present invention also include a method for decoding video data by a decoder. The method includes receiving at least one measurement from a set of measurements that represent the video data, and obtaining a measurement matrix that was applied to the video data at an encoder. The measurement matrix includes an assigned pattern of pixel values. The method further includes reconstructing the video data according to a total variation (TV) of discrete cosine transform (DCT) coefficients of candidate video data. The candidate video data is based on the measurement matrix and the received measurements. The TV is one of anisotropic TV and isotropic TV.

The reconstruction step further includes determining the DCT coefficients in a temporal direction of the candidate video data, determining the TV of the DCT coefficients on a frame-by-frame basis, and calculating a set of values according to a minimization of the TV of the DCT coefficients. The method further includes reconstructing frames of the video data based on the set of values. Also, the method may reconstruct the video data by forming at least one temporal structure based on the set of values, where the temporal structure includes a sub-block of video data from each frame in the video data, and reconstructing the video data based on the at least one temporal structure.

The measurement matrix is represented by a set of measurement bases, and each measurement basis of the set of measurement bases has a temporal structure with pixel values of a random pattern. Also, the measurement matrix may be a randomly permutated Walsh-Hadamard matrix.

Embodiments of the present invention provide an apparatus for encoding video data. The apparatus includes an encoder configured to receive video data including frames, and to determine at least one temporal structure based on a series of consecutive frames in the video data, where the temporal structure includes a sub-block of video data from each frame in the series. The encoder is configured to obtain a measurement matrix. The measurement matrix includes an assigned pattern of pixel values. The encoder is configured to generate a set of measurements by applying the measurement matrix to the at least one temporal structure. The set of measurements is coded data representing the at least one temporal structure.

Also, the encoder may extract the sub-block of video data from a same location in each of the frames in the series and form the temporal structure based on the extracted sub-blocks. Further, the encoder may extract the sub-block of video data from a different location in at least one frame of the series and form the temporal structure based on the extracted sub-blocks, where the extracted sub-blocks represents a motion trajectory of an object.

Also, the encoder may be configured to scan pixels of the temporal structure to obtain a one-dimensional (1-D) vector, and multiply the 1-D vector by each column of the measurement matrix to generate the set of measurements. The 1-D length of the vector may be based on a number of horizontal and vertical pixels in one frame and the number of consecutive frames in the series.

Embodiment of the present invention provide an apparatus for decoding video data. The apparatus includes a decoder configured to receive at least one measurement from a set of measurements that represent the video data and obtain a measurement matrix that was applied to the video data at an encoder. The measurement matrix includes an assigned pattern of pixel values. Also, the decoder is configured to reconstruct the video data according to a total variation (TV) of discrete cosine transform (DCT) coefficients of candidate video data. The candidate video data is based on the measurement matrix and the received measurements. The TV is one of anisotropic TV and isotropic TV.

Also, the decoder may be configured to determine the DCT coefficients in a temporal direction of the candidate video data and the TV of the DCT coefficients on a frame-by-frame basis, and calculate a set of values according to a minimization of the TV of the DCT coefficients.

The decoder may be configured to reconstruct frames of the video data based on the set of values. Also, the decoder may be configured to form at least one temporal structure based on the set of values and reconstruct the video data based on the at least one temporal structure.

The measurement matrix may be represented by a set of measurement bases, and each measurement basis of the set of measurement bases has a temporal structure with pixel values of a random pattern.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

DETAILED DESCRIPTION OF EXAMPLE EMBODIMENTS

Figure 1:
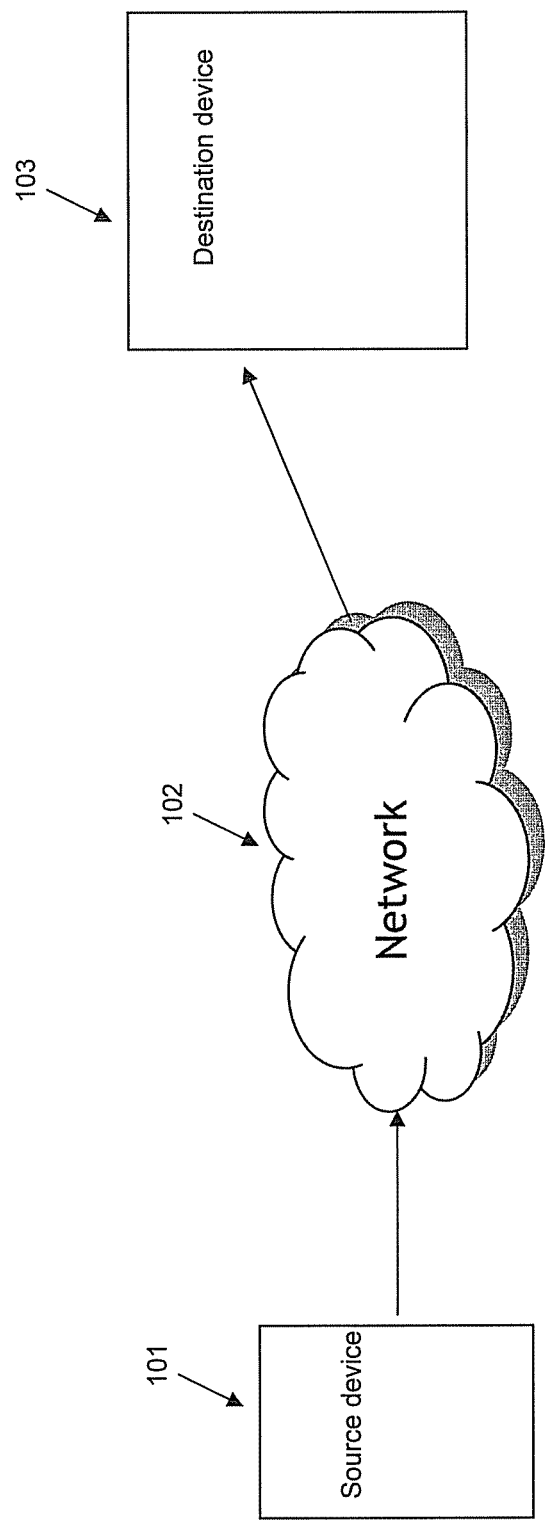
FIG. 1 illustrates a communication network according to an embodiment of the present invention.

Various embodiments of the present invention will now be described more fully with reference to the accompanying drawings. Like elements on the drawings are labeled by like reference numerals.

As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The present invention will now be described with reference to the attached figures. Various structures, systems and devices are schematically depicted in the drawings for purposes of explanation only and so as not to obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. To the extent that a term or phrase is intended to have a special meaning, i.e., a meaning other than that understood by skilled artisans, such a special definition will be expressly set forth in the specification that directly and unequivocally provides the special definition for the term or phrase.

Embodiments of the present invention provide a method and apparatus for encoding and decoding video data using compressive measurements. The first part of this disclosure describes encoding video data using compressive measurements, and then transmitting a set of measurements representing the original video data. The second part of this disclosure describes decoding the encoded video data by reconstructing the video data using an optimization process on the transmitted set of measurements.

FIG. 1 illustrates a communication network according to an embodiment of the present invention. The communication network includes at least one source device 101 for acquiring, encoding and/or transmitting video data, a network 102 supporting a video transmission application, and at least one destination device 103 for receiving, decoding and/or displaying the received video data. The network 102 may be any known transmission, wireless or wirelined, network. For example, the network 102 may be a wireless network which includes a radio network controller (RNC), a base station (BS), or any other known component necessary for the transmission of video data over the network 102 from one device to another device. The video transmission application part of the network 102 may include Digital Video Broadcasting-Handheld (DVB-H), Digital Video Broadcasting-Satellite services to Handhelds (DVB-SH), Long Term Evolution (LTE) or evolved Multimedia Broadcast and Multicast Services (eMBMS), for example. One device may transmit video information to another device via a dedicated or shared communication channel.

The source device 101 may be any type of device capable of acquiring video data and encoding the video data for transmission via the network 102 such as personal computer systems, camera systems, mobile video phones, smart phones, or any type of computing device that may connect to the network 102, for example. Each source device 101 includes at least one processor, a memory, and an application storing instructions to be carried out by the processor. The acquisition, encoding, transmitting or any other function of the source device 101 may be controlled by at least one processor. However, a number of separate processors may be provided to control a specific type of function or a number of functions of the source device 101. The implementation of the controller(s) to perform the functions described below is within the skill of someone with ordinary skill in the art.

The destination device 103 may be any type of device capable of receiving, decoding and displaying video data such as personal computer systems, mobile video phones, smart phones or any type of computing device that may receive video information from the network 102. The receiving, decoding, and displaying or any other function of the destination device 103 may be controlled by at least one processor. However, a number of separate processors may be provided to control a specific type of function or a number of functions of the destination device 103. The implementation of the controller(s) to perform the functions described below is within the skill of someone with ordinary skill in the art.

Figure 2:
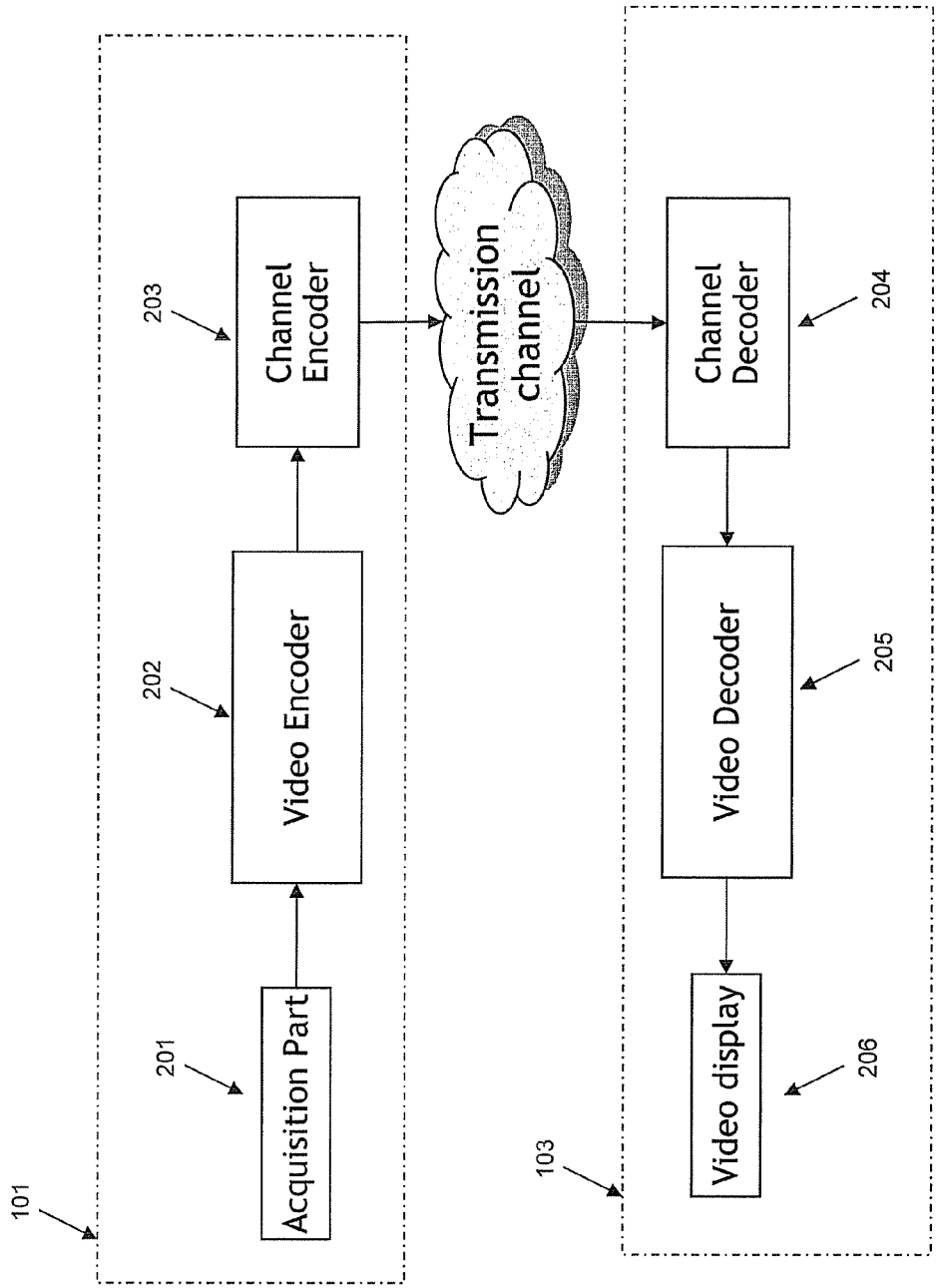
FIG. 2 illustrates components of a source device and destination device according to an embodiment of the present invention.

FIG. 2 illustrates components of the source device 101 and the destination device 103 according to an embodiment of the present invention. For example, the source device 101 includes an acquisition part 201, a video encoder 202, and a channel encoder 203. In addition, the source device 101 may include other components that are well known to one of ordinary skill in the art. Referring to FIG. 2, the acquisition part 201 acquires video data from a video camera component included in the source device 101 or connected to the source device 101. Also, the source device 101 may acquire video data from any type of computer-readable medium such as optical disks and/or any type of memory storage. The acquisition of video data may be accomplished according to any well known methods.

According to an embodiment of the present invention, the video encoder 202 encodes the acquired video data using compressive measurements to generate a set of measurements, which represents the acquired video data. For example, the video encoder 202 determines a temporal structure based on a series of consecutive frames in the video data. The temporal structure includes a sub-block of video data from each frame in the series. The temporal structure may be one of a video cube and video tube. For example, the video encoder 202 converts the acquired video data into video cubes or video tubes and encodes the video cubes or tubes using compressive measurements by applying a measurement matrix to the video cubes or tubes to obtain a set of measurements, which may be represented by a vector. The video encoder 202 is further explained with reference to FIG. 3-6 of the present invention.

Using the set of measurements, the channel encoder 203 codes the measurements to be transmitted in the communication channel. For example, the measurements are quantized to integers. The quantized measurements are packetized into transmission packets. Additional parity bits are added to the packets for the purpose of error detection and/or error correction. It is well known in the art that the measurements thus coded can be transmitted in the network 102.

Next, the source device 101 may transmit the encoded video data to the destination device via the communication channel of the network 102.

The destination device 103 includes a channel decoder 204, a video decoder 205, and a video display 206. The destination device 103 may include other components that are well known to one of ordinary skill in the art.

The channel decoder 204 decodes the data received from communication channel. For example, the data from the communication channel is processed to detect and/or correct errors from the transmission by using the parity bits of the data. The correctly received packets are unpacketized to produce the quantized measurements made in the video encoder 202. It is well known in the art that data can be packetized and coded in such a way that a received packet at the channel decoder 204 can be decoded, and after decoding the packet can be either corrected, free of transmission error, or the packet can be found to contain transmission errors that cannot be corrected, in which case the packet is considered to be lost. In other words, the channel decoder 204 is able to process a received packet to attempt to correct errors in the packet, to determine whether or not the processed packet has errors, and to forward only the correct measurements from an error free packet to the video decoder 205.

The video decoder 205 reconstructs the video data, which is performed by a minimization of two-dimensional (2D) total variation (e.g., a TV function) of 1-dimensional (1D) discrete cosine transform (DCT) coefficients in the time domain. For example, the decoder reconstructs the video data according to the TV of the DCT coefficients of candidate video data, where the candidate video data is based on the measurement matrix and the received measurements.

However, in order to perform the reconstruction, it is not required that the video data be encoded using the specific temporal structure that was formed at the encoder 202 (e.g., video cubes or tubes). Rather, this decoding or reconstruction process may be performed irrespective of how the video data is specifically encoded. In other words, as long as the source device 101 transmits a set of measurements, the video decoder 205 may reconstruct the encoded video data, which is further described with reference to FIGS. 8-11 of the present invention. Next, the destination device 103 displays the decoded video data on the video display 206.

Figure 3:
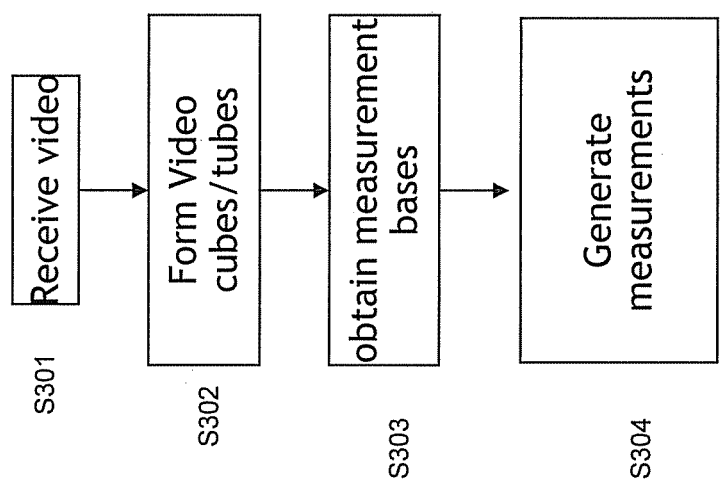
FIG. 3 illustrates a method of encoding the received video data using compressive measurements according to an embodiment of the present invention.

FIG. 3 illustrates a method of encoding the acquired video data using compressive measurements by the video encoder 202 according to an embodiment of the present invention.

Referring to FIG. 3, in step S301, the video encoder 202 receives the video data including video frames from the acquisition part 201. In step S302, the video encoder 202 determines a temporal structure based on a series of consecutive frames in the video data, where the temporal structure includes a sub-block of video data from each frame in the series. The temporal structure may be one of a video cube and a video tube. For example, the video encoder 202 converts the video data into video cubes or video tubes from a number of consecutive frames in the video data. The number of consecutive frames in the series may be a fixed or variable number. First, embodiments of the present invention will describe how video cubes are formed. Second, embodiments of the present invention will describe how video tubes are formed. Video cubes are a special type of video tube. Irrespective, if the video data is formed into video cubes or video tubes, subsequent steps S303 and S304 of FIG. 3 described in detail below are the same.

Figure 4:
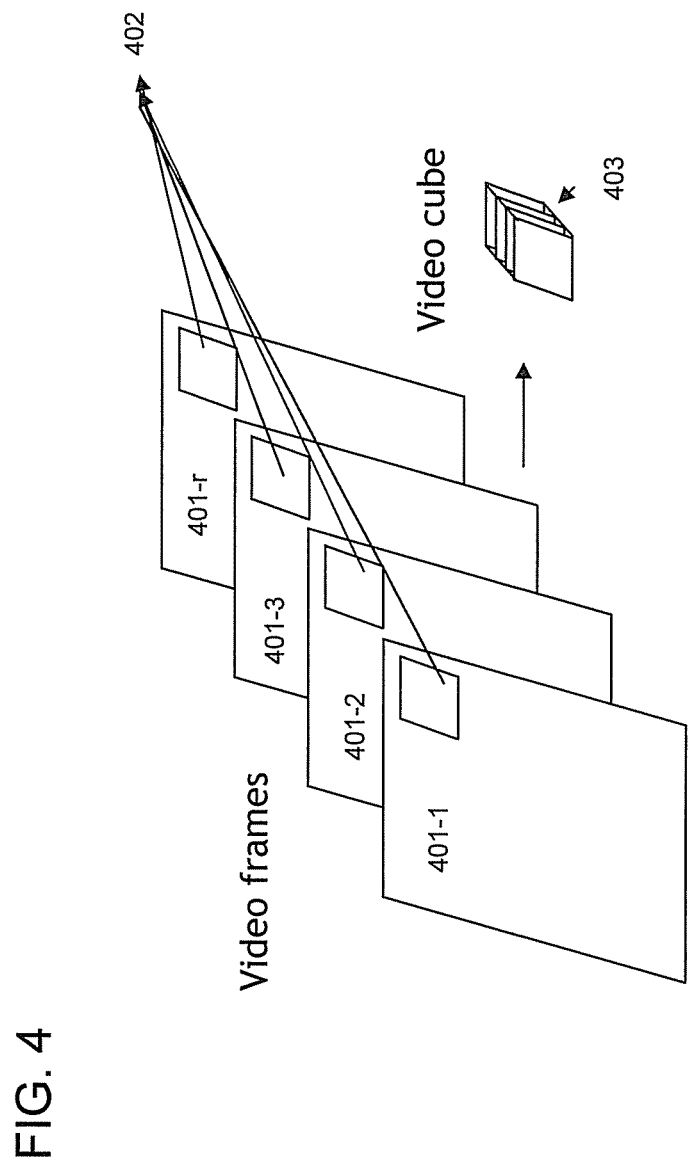
FIG. 4 illustrates a diagram that shows how the video encoder forms the video data into a video cube according to an embodiment of the present invention.

FIG. 4 illustrates a diagram that shows how the video encoder 202 forms the received video data into video cubes according to an embodiment of the present invention. In FIG. 4, the video data includes consecutive video frames 401-1 to 401-$r$, where r may be any integer that may be fixed by the video encoder 202. Also, r may be a variable number that is not fixed by the video encoder 202. Each frame 401 of the video data has size P×Q, where P and Q are the number of horizontal and vertical pixels in each frame. The video data is divided into non-intersecting 2-D cubes. For example, the video encoder 202 extracts a 2-D non-overlapping block 402 of video data from each of the video frames 401 in the number of consecutive frames 401-1 to 401-$r$. Each block 402 for each frame 401 may have the same number of pixels and the blocks 402 may be extracted from the same location in each of the consecutive frames 401. The video encoder 202 forms the video cube 403 by stacking each extracted block 402 to form a three dimensional (3-D) video structure. Encoding is performed cube by cube on all video cubes that comprise the received video data.

Figure 5:
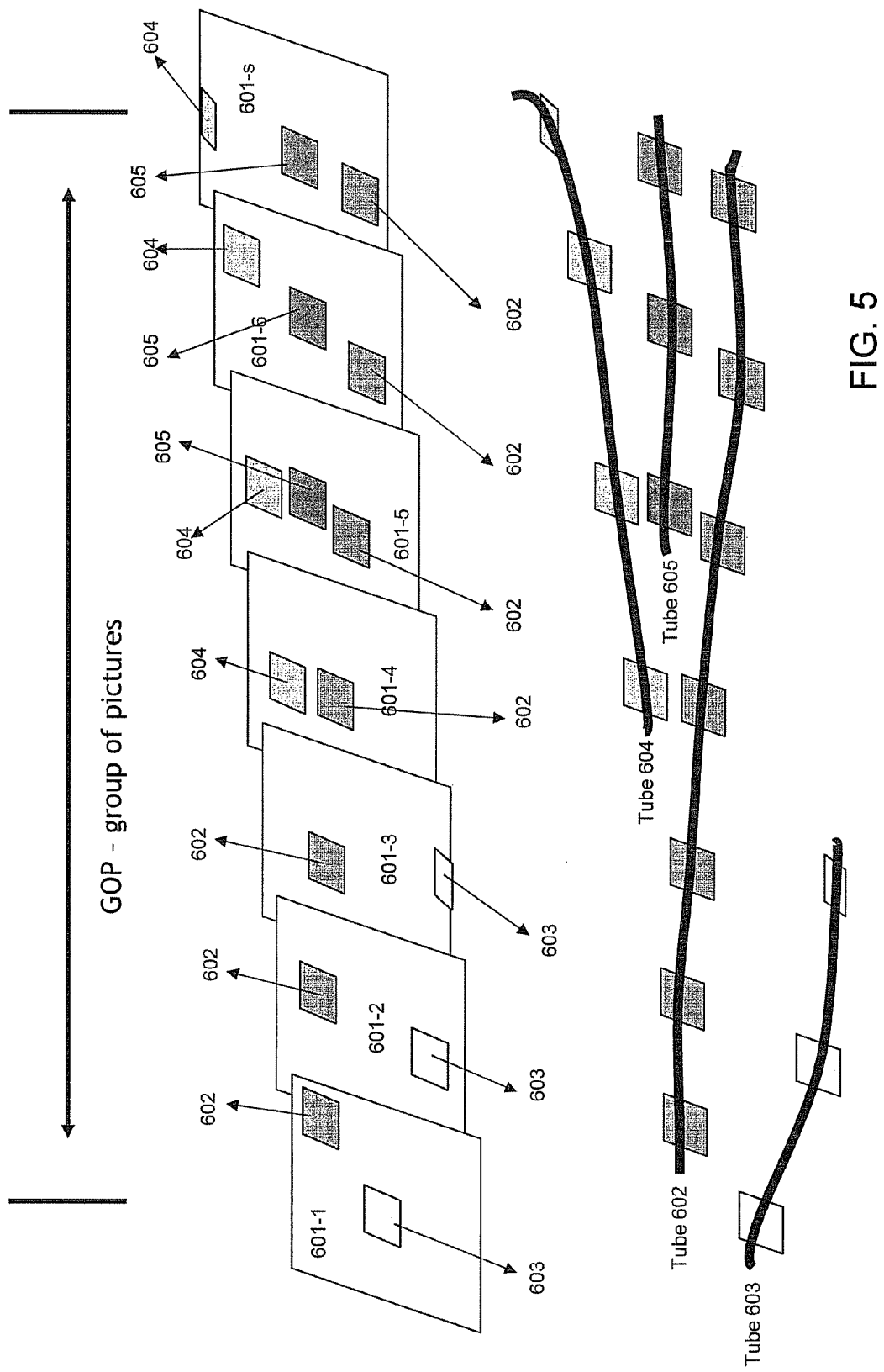
FIG. 5 illustrates a diagram that shows how the video encoder forms the video data into a video tube according to an embodiment of the present invention.

FIG. 5 illustrates a diagram that shows how the video encoder 202 forms the received video data into a video tube according to an embodiment of the present invention. For example, FIG. 5 illustrates a group of pictures (GOP) having consecutive frames 601-1 to 601-$s$, where s is the number of frames in the GOP. Each frame 601 of the video data has size P×Q, where P and Q are the number of horizontal and vertical pixels in each frame. For one video tube, the video encoder 202 extracts a non-overlapping 2-D block of video data from at least one video frame 601 in the GOP. For example, video tube 602 includes non-overlapping blocks 602 extracted from each of frames 601-1 to 601-$s$, which may follow the motion trajectory of a particular object in the GOP. The object may be a meaningful object in the video image such as an image of a person as he moves through the frames 601 of the GOP. As such, the blocks may be extracted from different locations in the video frames. FIG. 5 also illustrates video tubes 603, 604, 605 and 606, which are, similar to video tube 602. However, as shown in FIG. 5, each video tube may include extracted blocks that have different shapes and sizes, and may have different locations within their respective frames. Also, different video tubes may include a different number of frames. The video encoder 202 forms the video tubes by stacking each extracted block to form a 3-D video structure. Encoding is performed tube by tube on all video tubes that comprise the received video data.

Referring back to FIG. 3, in step S303, the video encoder 202 obtains a measurement matrix to be applied to the video cube or the video tube. In step S304, the video encoder 202 generates a set of measurements by applying the video cube or video tube to the measurement matrix, where the set of measurements represents the formed encoded video cubes or video tubes. The measurement matrix may be graphically represented by a set of measurement bases. The set of measurements bases may be video cubes or video tubes having pixel values of a random pattern. However, embodiments of the present invention include any type of pattern for the set of measurement bases. For instance, if the video encoder 202 forms the received video data into video cubes, the set of measurement bases is structured as video cubes, and the set is referred to as video basis cubes. If the video encoder 202 forms the acquired video data into video tubes, the set of measurement bases is structured as video tubes, and the set is referred to as video basis tubes. The video basis cubes or the video basis tubes include the same number of frames (and the same size of each frame) as the corresponding video cubes or video tubes. The step of generating the set of measurements is the same for video cubes or video tubes.

Figure 6:
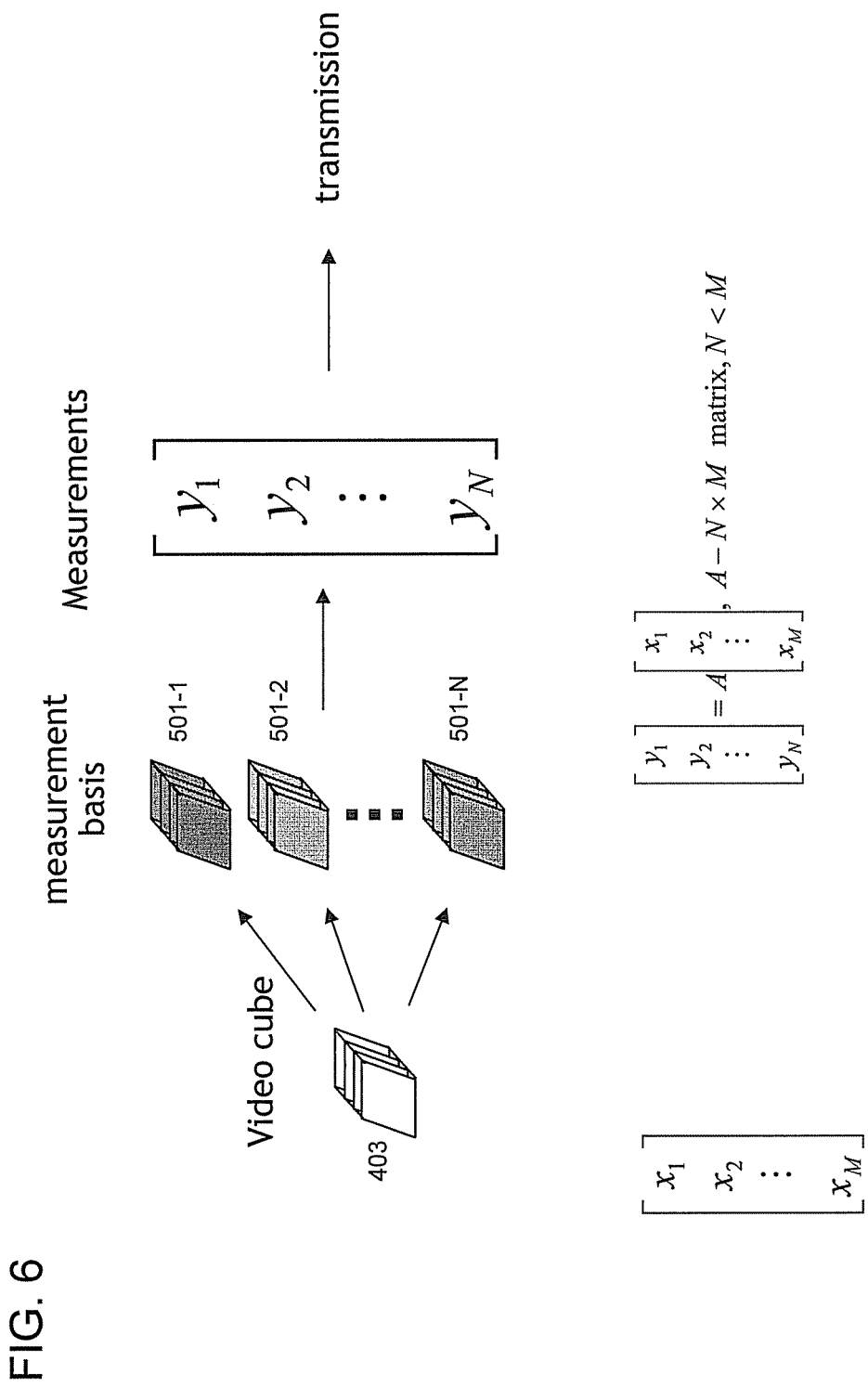
FIG. 6 illustrates an encoding process that applies a set of measurement bases to the video cube according to an embodiment of the present invention.

FIG. 6 illustrates an encoding process that applies the set of measurement bases to the video cube 403 according to an embodiment of the present invention. For example, the video encoder 202 applies a set of measurement bases 501-1 to 501-N to the video cube 403 to obtain a set of measurements $y_1$ to $y_N$. Variable N may be any integer greater or equal to 1. A number of measurement bases N applied to the video cube 403 corresponds to a number of measurements N. As explained above, the set of measurement bases 501-1 to 501-N is a graphical representation of the measurement matrix A, as shown in FIG. 6, and explained above. Therefore, the set of measurement bases and the measurement matrix may be used interchangeably.

The video encoder 202 scans the pixels of the video cube 403 to obtain vector $x \in \Re^M$, which is a 1-D representation of the 3-D video cube 403, where M=P×Q×r is the length of the vector x. For instance, as shown in FIG. 6, the 1-D representation of the 3-D video cube is vector $[x_1 \, x_2 \ldots x_M]$. Normally, the pixels in a video cube, especially when the frames of the video cube 403 are chosen by a motion estimate scheme, are highly correlated, and therefore, the vector x is sparse (e.g., a small number of nonzero components) in a basis. This means that vector x may be represented by using compressive measurements. The length of vector x is M, which is also the number of pixels in a video cube or video tube.

As shown in FIG. 6, the 1-D representation vector x may be multiplied by each column of the measurement matrix A, to obtain the set of measurements $y_1$ to $y_N$. Each column of the measurement matrix A may represent one measurement basis. The measurement matrix A may be constructed using randomly permutated Walsh-Hadamard matrix. However, embodiments of the present invention encompass any type of matrix for use as the measurement matrix A. As such, the N compressive measurements of vector x is the vector $y \in \Re^M$ defined by y=Ax. Matrix A has dimension N×M, where N is the number of measurements, and M is the length of the vector x, i.e., M is the number of pixels in a video cube or video tube.

Figure 7:
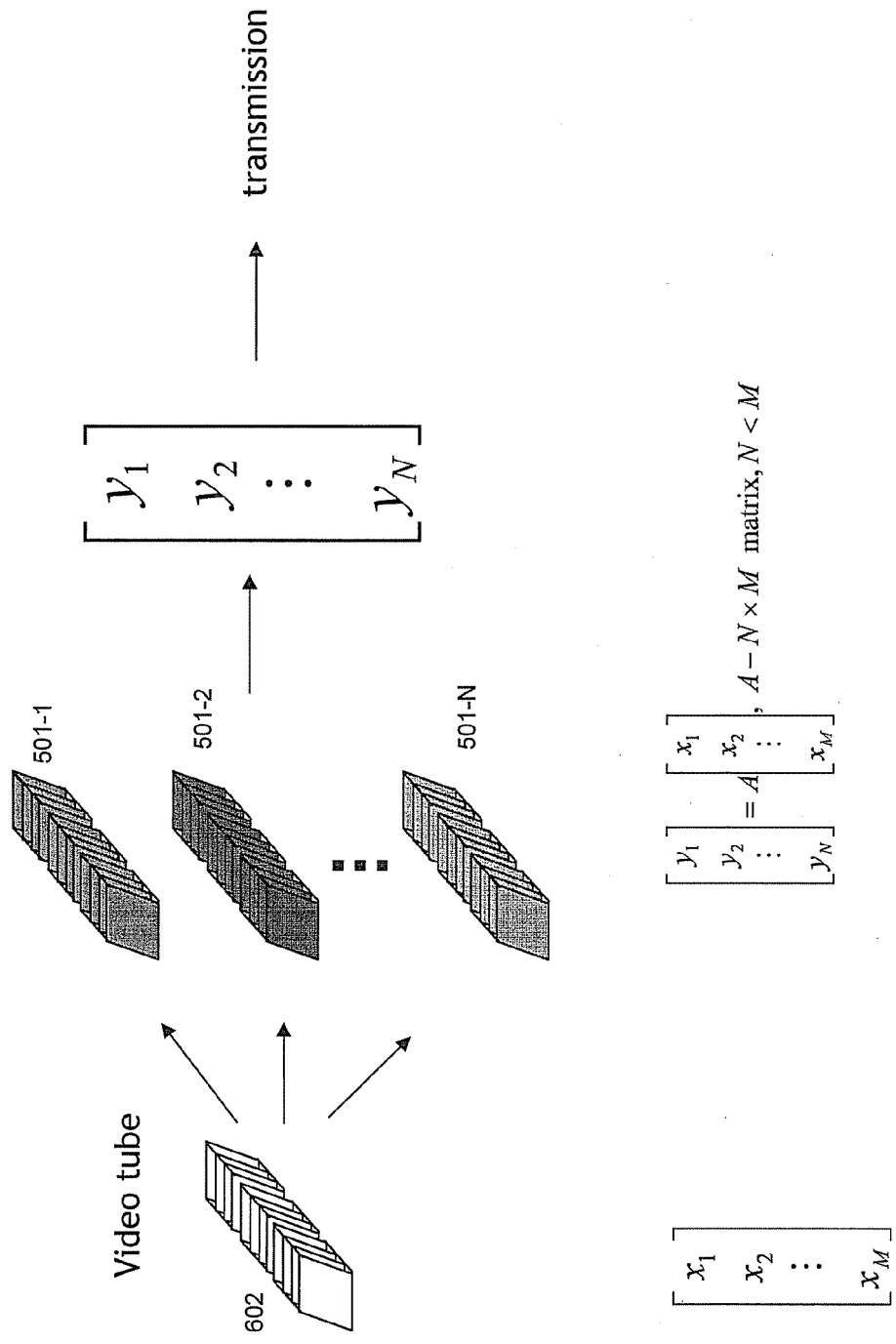
FIG. 7 illustrates an encoding process that applies the set of measurement bases to the video tube according to an embodiment of the present invention.

FIG. 7 illustrates an encoding process that applies the measurement matrix A to the video tube 602 according to an embodiment of the present invention. For example, the source device 101 applies a set of measurement bases 501-1 to 501-N to the video tube 602 to obtain a set of measurements $y_1$ to $y_N$. Because the description of FIG. 7 is the same as the description of FIG. 6, a detailed discussion of this figure is omitted for the sake of brevity.

The encoding process described above may provide scalability, where the encoded video may be decoded with different quality, and complexity. Also, the complexity of the encoding process is further reduced as compared to the traditional standards as described in the background section of this disclosure. Also, embodiments of the present invention are auto-adaptive to channel conditions, include graceful degradation, and joint source and channel encoding. The decoding process uses all correctly received measurements. For channels with higher capacity, more measurements are received correctly, and hence more measurements are used in reconstructing the video, and therefore, the reconstructed video has higher quality. The decoding complexity is proportional to the number of measurements used in reconstruction. Therefore, a decoder may decide to use fewer number of measurements (for a reduced video quality) to reduce the complexity for the reason of, for example, saving battery power.

The video encoder 202 outputs the set of measurements $y_1$ to $y_N$ to the channel encoder 203. The channel encoder 203 encodes the set of measurements $y_1$ to $y_N$ for transmission to the destination device 103 in a manner that was previously described. Next, the source device 101 transmits the set of measurements $y_1$ to $y_N$ and a description of the measurement matrix A to the destination device 103 via the communication channel of the network 102.

The channel decoder 204 of the destination device 101 decodes the data from the transmission, and forwards the correctly received measurements to the video decoder 205 in a manner that was previously described above. The video decoder 205 reconstructs the video data based on a set of values that are calculated from the received measurements using a minimization equation, as described below.

Figure 8:
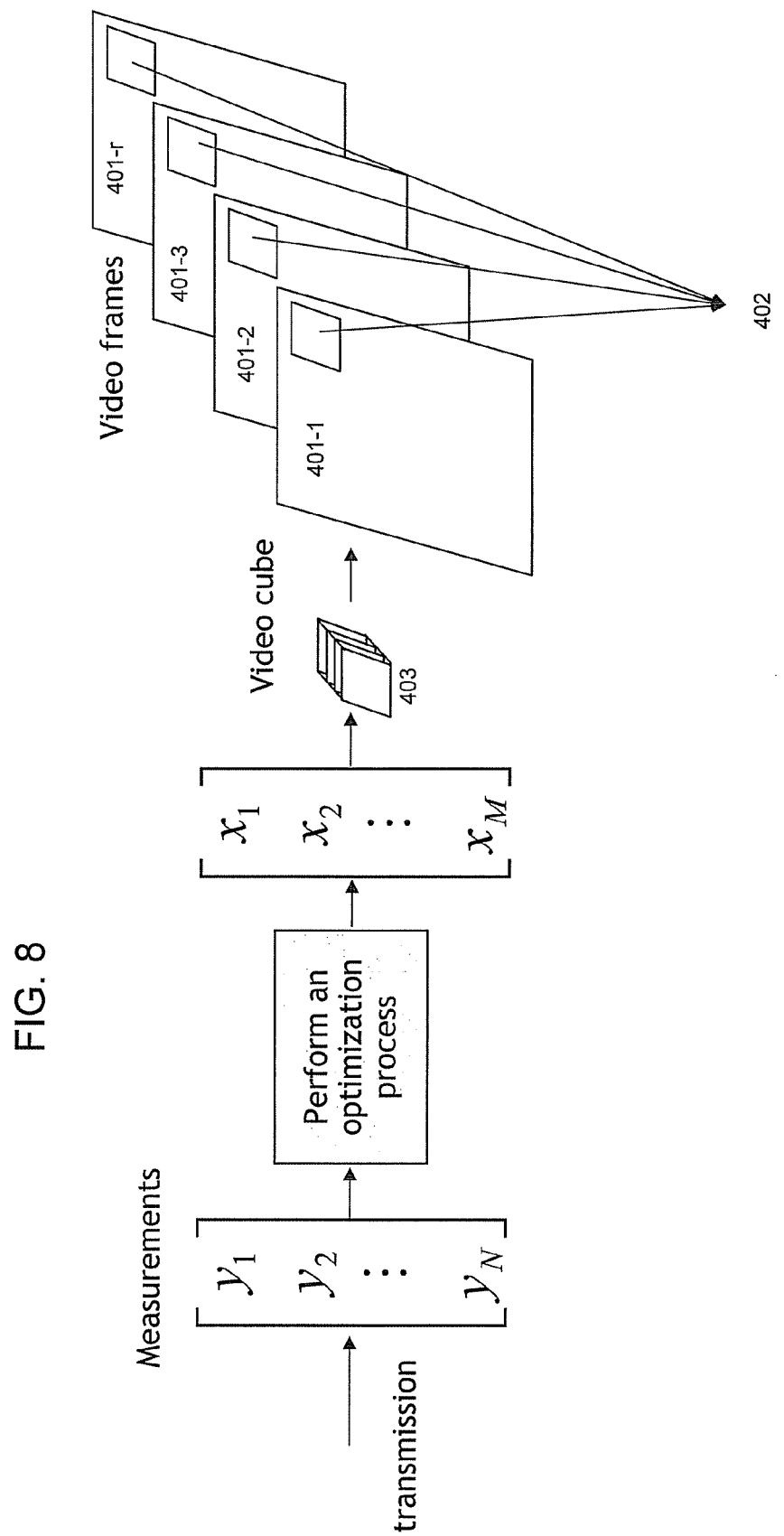
FIG. 8 illustrates a process for decoding the video data by the video decoder according to an embodiment of the present invention.

FIG. 8 illustrates a process for decoding the video data by the video decoder 205 according to an embodiment of the present invention.

The video decoder 205 performs an optimization process on the correctly received measurements to obtain the vector $[x_1 \, x_2 \ldots x_M]$, which is a 1-D representation of the video cube 403. For example, the optimization process is a minimization of the 2-D total variation of the 1-D DCT coefficients in the time domain, which is further explained with reference to FIGS. 9-11. After the values for the vector $[x_1 \, x_2 \ldots x_M]$ are obtained according to the optimization process, the video decoder 103 reconstructs the video cube 403 from the vector $[x_1 \, x_2 \ldots x_M]$. For example, if $M = P \times Q \times r$ (i.e., if the video cube has r frames), and each frame has Q rows and P columns, the video cube 403 can be formed from $[x_1 \, x_2 \ldots x_M]$ by taking the first Q values of x to form the first column in the first frame of video cube, and taking the next Q values of x to form the second column in the first frame of the video cube 403, etc. However, embodiments of the present invention encompass any type of method that reconstructs video frames (or a particular temporal structure of a video frame such as video cubes or video tubes) from a set of values. For example, the video decoder 205 may reconstruct the original frames of the video data based on the set of values. This reconstruction process will be the inverse of the process in which the vector x is formed from the temporal structure when the measurements are made.

Figure 9:
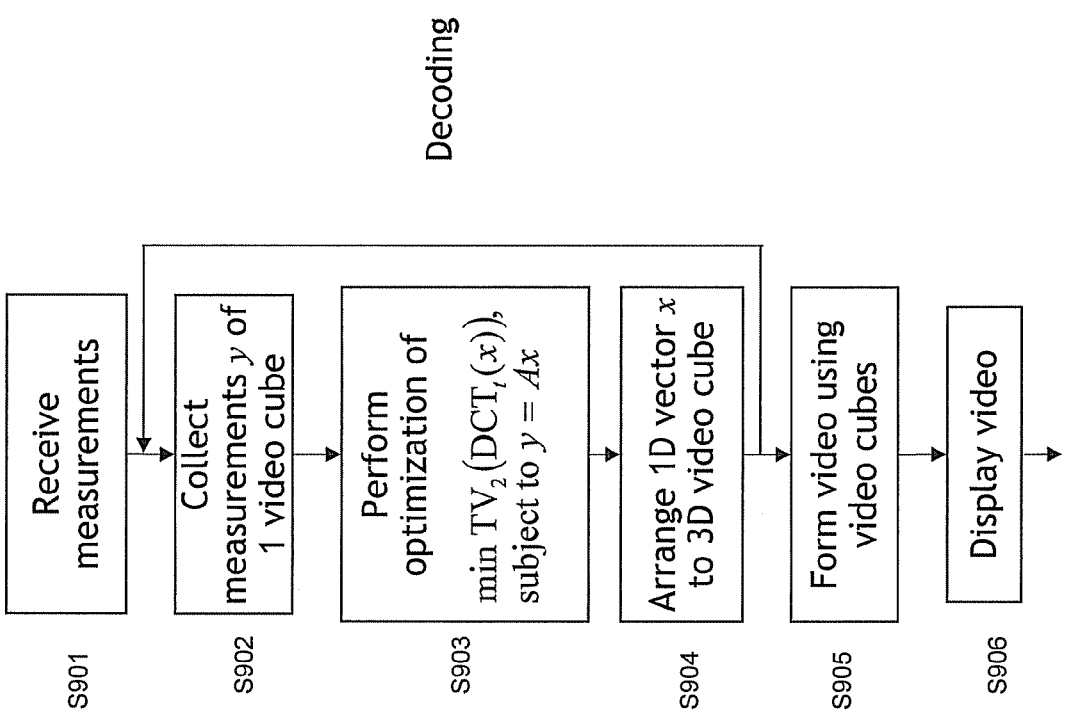
FIG. 9 illustrates a method for decoding by the video decoder according to an embodiment of the present invention.

FIG. 9 illustrates a method for decoding by the video decoder 205 according to an embodiment of the present invention. The decoding process described below reconstructs the video cubes 403. However, it is noted that the same process may be applied to video tubes 602 as well. Also, the decoding method of the present invention are not limited to video cubes and video tubes. Rather, the decoding process may be implemented in any type of system that transmits a set of measurements representing the video data.

In step S901, the video decoder 205 receives the available measurements. In step S902, the video decoder 205 collects the available measurements from $y_1$ to $y_n$ of one video cube 403. In S903, the video decoder 205 obtains a set of values—the vector $[x_1 \, x_2 \ldots x_M]$—by solving one of the following two minimization equations, which represents a minimization problem:

$$\min_x TV_2(DCT_t(x)), \text{ subject to } y = Ax, \text{ or} \qquad \text{Equation 1}$$

$$\min_x TV_2(DCT_t(x)) + \frac{\mu}{2}\|Ax - y\|_2^2 \qquad \text{Equation 2}$$

In both equations, y is the set of available transmitted measurements for one video cube, i.e., $y_1$ to $y_N$, and A is the measurement matrix representing the set of measurement bases, i.e., 501-1, 501-N, and x is the vector $[x_1 \, x_2 \ldots x_M]$, whose components are pixels of a video cube or a video tube. The decoder 205 obtains the measurement matrix A that was applied to the video data at the encoder 202. For example, the measurement matrix A may be obtained based on information that was transmitted from the source device 101, or maybe be obtained from a storage unit that stores the measurement matrix A. The variable $\mu$ is the penalty parameter. The value of the penalty parameter is a design choice. $DCT_t(x)$ is a 1-D DCT transform in the time domain, and $TV_2(z)$ is a 2-D total variation function, where z represents the results of the 1-D DCT function. Equation 2 is an alternative way of expressing Equation 1. However, the video decoder 205 may implement either Equation 1 or Equation 2 according to methods that are well known.

The video decoder 205 solves the minimization problem of Equation 1 or Equation 2 to obtain the vector $[x_1 \, x_2 \ldots x_M]$. For example, the video decoder 205 reconstructs the video data according to the total variation (TV) of a discrete cosine transform (DCT) coefficients of candidate video data. The candidate video data is based on the measurement matrix A and the received measurements. For example, in $y = Ax$, the received measurements y and the measurement matrix A are known. As such, the minimization problem solves for values of x (e.g., the vector x), which the resulting values of vector x are the minimum values of a total variation ($TV_2$) function of a discrete cosine transform (DCT) function. The creation of Equation 1 and Equation 2 is further described below.

For example, the minimization problem may also be characterized as: Equation 1:

$$\min_x \Phi(x) \text{ subject to } y = Ax,$$

or Equation 2 (which have equivalents to Equations 1 and 2 above):

$$\min_x \Phi(x) + \frac{\mu}{2}\|Ax - y\|_2^2$$

$\Phi(x)$ represents the choice of a regularization term and $\mu$ is the penalty parameter. If the vector x is sparse, $\Phi(x)$ may be chosen as the $l_1$-norm of the vector x. However, when the vector x includes pixel values of the video cube 403, it may not be apparent in which basis x is sparse, and further, in which basis, x has the most sparseness.

Embodiments of the present invention use the minimum spatial total variation of time domain DCT coefficients of the original video cube as the regulation term, which is provided in the following equation $\Phi(x) = TV_s(DCT_t(x))$. $DCT_t(x)$ represents the pixel wise DCT in the temporal direction, and it is a cube in which each frame includes DCT coefficients of a particular frequency.

Figure 10:
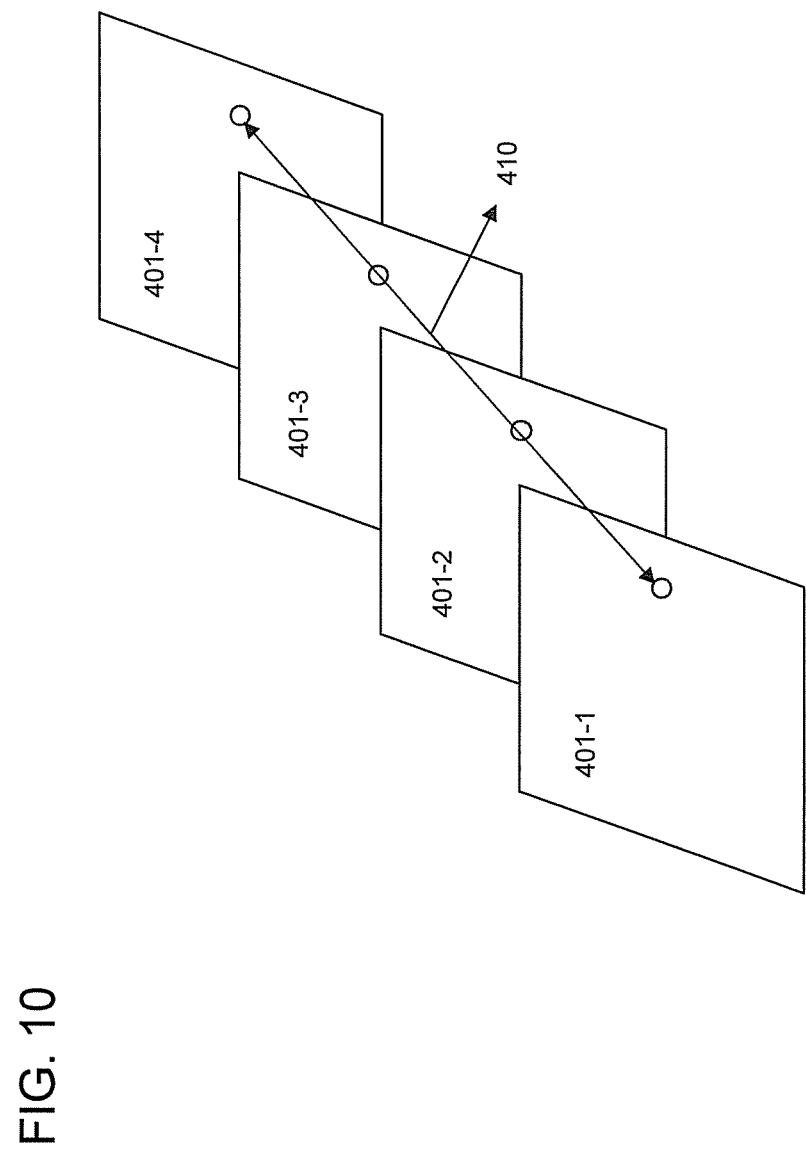
FIG. 10 illustrates a pixel wise discrete cosine transform (DCT) in a temporal direction according to an embodiment of the present invention.

FIG. 10 illustrates the pixel wise DCT in a temporal direction according to an embodiment of the present invention. For example, FIG. 10 illustrates frames 401-1 to 401-4, where a candidate pixel is chosen from one frame (401-1), and corresponding pixels from the same location are selected in the other frames, which is indicated by arrow 410 connecting these pixels. The video decoder 205 performs the DCT function on each of these pixels in the manner indicated by the arrow 410. As a result of performing the DCT function, the video decoder 205 obtains time domain DCT coefficients of a particular frequency.

Next, the video decoder 205 performs the total variation on top of the results of the pixel wise DCT on a frame by frame basis. For example, as shown below, $TV_s(z)$ is the 2D total variation of the matrix z defined as $$TV_s(z) = \sum_{i,j,k} \sqrt{(z_{i+1jk} - z_{ijk})^2 + (z_{ij+1k} - z_{ijk})^2}$$

for isotropic total variation, or $$TV_s(z) = \sum_{i,j,k} |z_{i+1jk} - z_{ijk}| + |z_{ij+1k} - z_{ijk}|$$

for anisotropic total variation.

Figure 11:
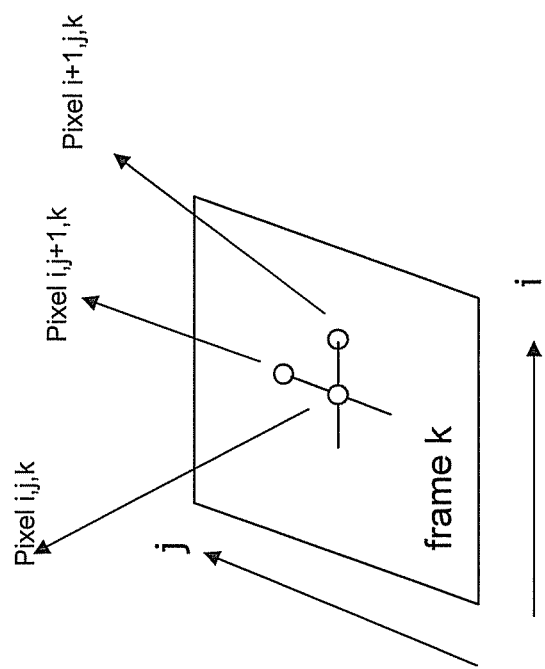
FIG. 11 illustrates a total variation ($TV_2$) function for anisotropic total variation or isotropic total variation according to an embodiment of the present invention.

FIG. 11 illustrates the $TV_2$ function for anisotropic total variation or isotropic total variation according to an embodiment of the present invention. Anisotropic or isotropic are different types of total variation, where embodiments of the present invention encompass either the anisotropic total variation or the isotropic total variation. FIG. 11 includes a frame that has three pixels, (i,j,k), (i,j+1,k) and (i+1,j,k). A description of the $TV_2$ function being applied to arbitrary pixel i,j,k is discussed below. However, it is noted that the three pixels illustrated in FIG. 11 are for explanation purposes only. In reality, the frame includes a number of pixels, and the $TV_2$ function is applied to each pixel in the frame, as well as the other frames on a frame-by-frame basis.

For example, for anisotropic total variation, the video decoder 205 calculates an absolute value of the difference between pixel i,j,k and the next vertical pixel i,j+1,k and an absolute value of the difference between pixel i,j,k and the next vertical pixel i+1,j,k, and adds both absolute values together. This calculation is then performed for each pixel in the frame, where values outside the frame are given an arbitrary value such as zero. The process repeats itself for each frame. In the above, i is the index for the horizontal pixels of a frame, j is the index of vertical pixels and k is the index for the frames in a video cube.

For isotropic total variation, the video decoder 205 squares the difference between pixel i,j,k and the next vertical pixel i,j+1,k and squares the difference between pixel i,j,k and the next vertical pixel i+1,j,k. The results of this calculation are then added, where the square root is performed on the results of the addition. This calculation is then performed for each pixel in the frame, where values outside the frame are given an arbitrary value such as zero. The process repeats itself for each frame.

The video decoder 205 may include a TV minimization solver (TVAL3) for solving Equation 1 or Equation 2. For instance, TVAL3 is based on an augmented Larangian method and alternating minimization. A Lagrange method provides a strategy for finding the maxima and minima of a function subject to constraints. The development of TVAL3 is described below.

At each outer iteration of TVAL3, TVAL3 minimizes the corresponding augmented Lagrangian function by solving two subproblems alternately. One subproblem is separable and has closed-form solution while the other subproblem is quadratic and is be approximated by one-step steepest descent with aggressive step length. A strategy similar to Equation 1 and Equation 2 is employed. Because the derivation of the algorithm is almost the same for Equation 1 and Equation 2, Equation 1 is used for the detailed discussion.

Let $T_i \in \mathfrak{R}^{2 \times n}$ denote the linear transformation satisfying $T_i x = D_i(DCT_t(x))$ for any $1 \le i \le n$. Then, Equation 1 becomes:

$$\min_x \sum_{i=1}^n \|T_i x\| \text{ s.t. } y = Ax. \qquad \text{Equation 3}$$

By introducing a series of new variables $w_i = T_i x$, a variant of Equation 3 is provided below:

$$\min_{x,w_i} \sum_{i=1}^n \|w_i\| \text{ s.t. } y = Ax \text{ and } w_i = T_i x, \forall i. \qquad \text{Equation 4}$$

Equation 4 corresponding augmented Lagrangian function is:

$$L_A(x, w_i) = \sum_{i=1}^n \left( \|w_i\| - v_i^T(T_i x - w_i) + \frac{\beta_i}{2}\|T_i x - w_i\|_2^2 \right) - \qquad \text{Equation 5}$$

$$\lambda^T(Ax - y) + \frac{\mu}{2}\|Ax - y\|_2^2.$$

Assuming $x^*$ and $w_i^*$ denote the true minimizers of $L_A(x, w_i)$, the augmented Lagrangian method minimizes Equation 5 recursively and then updates multipliers $v_i$ and $\lambda$ at the end of each iteration as follows:

$$\begin{cases} \tilde{v}_i = v_i - \beta_i(T_i x^* - w_i^*) \; \forall \; i, \\ \tilde{\lambda} = \lambda - \mu(Ax^* - y). \end{cases} \qquad \text{Equation 6}$$

To develop an efficient algorithm which can handle large-scale data sets such as video streams, $L_A(x, w_i)$ is minimized at a low complexity. An iterative method based on the alternating minimization is employed to minimize $L_A(x, w_i)$. For fixed x, minimizing $L_A(x, w_i)$ is equivalent to:

$$\min_{w_i} \sum_{i=1}^n \left( \|w_i\| - v_i^T(T_i x - w_i) + \frac{\beta_i}{2}\|T_i x - w_i\|_2^2 \right). \qquad \text{Equation 7}$$

This problem is separable with respect to each $w_i$ and has closed-form solution:

Equation 8

$$\tilde{w}_i = \begin{cases} \max\left\{\left|T_i x - \frac{v_i}{\beta_i}\right| - \frac{1}{\beta_i}\right\} \text{sgn}\left(T_i x - \frac{v_i}{\beta_i}\right) & \text{for anisotropic } TV, \\ \max\left\{\left\|T_i x - \frac{v_i}{\beta_i}\right\|_2 - \frac{1}{\beta_i}\right\} \frac{(T_i x - v_i/\beta_i)}{\|T_i x - v_i/\beta_i\|_2} & \text{for isotropic } TV. \end{cases} \qquad (3.6)$$

Equation 8 can be derived by using 1D and 2D shrinkage. On the other hand, for fixed $w_i$, minizing $L_A(x, w_i)$ is equivalent to:

$$\min_x Q(x) = \sum_{i=1}^n \left(-v_i^T(T_i x - w_i) + \frac{\beta_i}{2}\|T_i x - w_i\|_2^2\right) - \lambda^T(Ax - y) + \frac{\mu}{2}\|Ax - y\|_2^2. \quad \text{Equation 9}$$

$Q(x)$ is a quadratic function that could be minimized by various iterative methods. However, these methods may be too costly for large-scale data sets and unnecessary since the goal is to solve Equation 3 or 4 instead of Equation 9. Therefore, a good approximation of the true minimizer of Equation 9 should be good enough to guarantee the convergence. Specifically, embodiments of the present invention take one step of steep descent with aggressive step length and accept it as the approximate solution of Equation 9:

$$\tilde{x} = x - \alpha d(x). \quad \text{Equation 10}$$

Here, $\alpha$ denotes the step length and $d(x)$ denotes the gradient of quadratic function $Q(x)$ at the last iteration x. The step length can be iteratively determined by a nonmonotone line search, starting from the initial guess given by the Barzilai-Borwein method. The step length computed like this has been validated to be effective and efficient in practice. Therefore, the solver to minimize the augmented Lagrangian function can be described as follows:

Solver 1. Initialize starting points and parameters.
while not converge, do
for fixed x, compute $\tilde{w}_i$ according to Equation 8.
for fixed $w_i$, compute $\tilde{x}$ according to Equation 10, by taking one step of steepest descent.
end do In summary, the overall solver is given below:
Solver 2. Initialize starting points, multipliers, and penalty parameters.
while not converge, do
find the minimizers of the augmented Lagrangian function (Equation 5) by means of Algorithm 1, starting from the previous iterates.
update the multipliers according to Equation 6.
choose the new penalty parameters.
end do The framework of the overall solver described above can be also used to solve a larger range of minimization problems with different regularizations, such as 3D TV, $l_1$ under sparsity basis, etc.

Referring back to FIG. 9, in step S904, the video decoder 205 reconstructs the 3D video cube based on the obtained 1-D vector $x=[x_1 \ x_2 \ldots x_M]$. For example, as explained above, if $M=P \times Q \times r$, (i.e., if the video cube has r frames), and each frame has Q rows and P columns, the video cube can be formed from $[x_1 \ x_2 \ldots x_M]$ by taking the first Q values of x to form the first column in the first frame of the video cube, and taking the next Q values of x to form the second column in the first frame of the video cube, etc. However, embodiments of the present invention encompass any type of method that reconstructs video frames (or a particular structure of a video frame such as video cubes or video tubes) from a set of values. This process will be the inverse of the process in which the vector x is formed from video cube when the measurements are made.

After the video decoder 205 reconstructs one video cube or tube, the process goes back to S902 to reconstruct the other video cubes or tubes in the video data. After all the video cubes or tubes are reconstructed, in S905, the video decoder 205 forms the video data using the video cubes or tubes. The video frames are formed from video cubes or tubes in an exact inverse process of forming the video cubes from video frames. Specifically, each 2D block in a video cube is placed at the appropriate location in a video frame. Next, in S906, the destination device 103 displays the video data on the video display 206.

Figure 12:
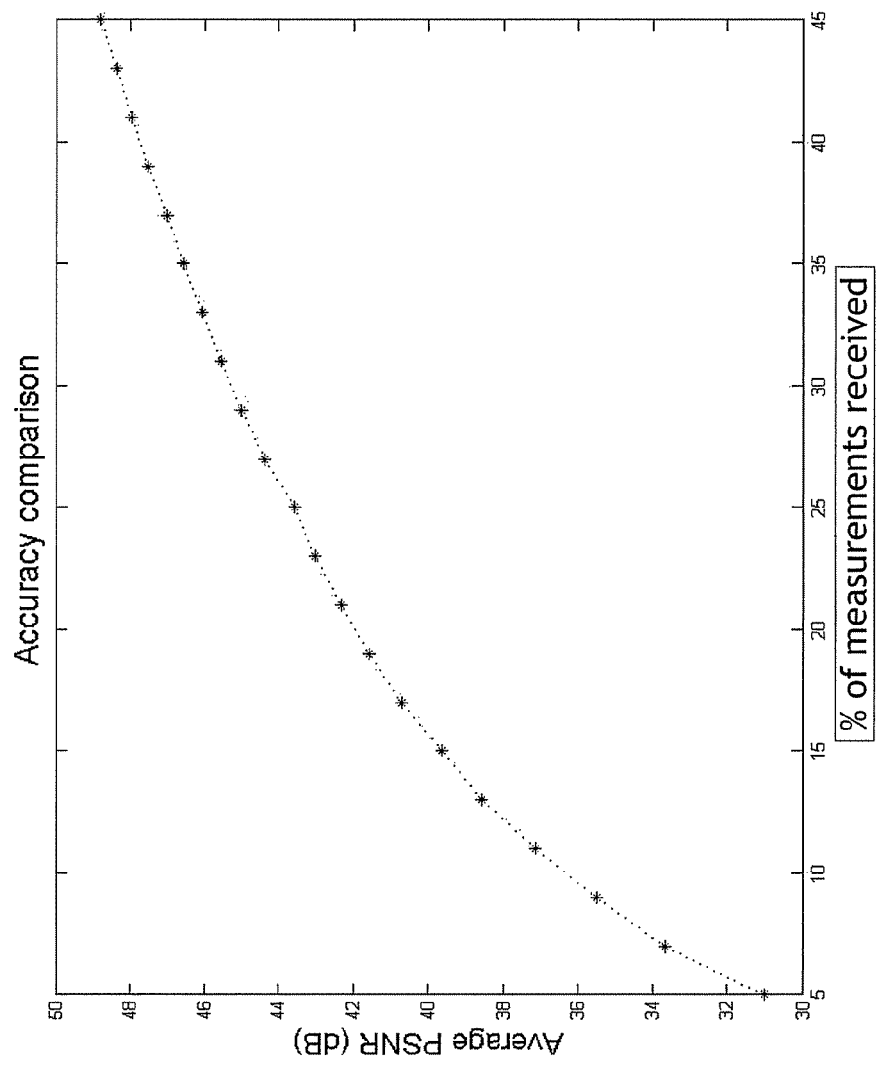
FIG. 12 illustrates a graph showing an accuracy comparison of the display video data according to the amount of measurements received by the destination device according to an embodiment of the present invention.

FIG. 12 illustrates a graph showing an accuracy comparison of the display video data according to the amount of measurements received by the destination device 103 according to an embodiment of the present invention. For example, the horizontal axis is the percentage of measurements that are correctly received by the destination device 103. The percentage is defined as $100 \times N/m$, where N is the number of correctly received measurements, and m is the total number of pixels in a video cube. The vertical axis is the peak signal to noise ratio (PSNR) of the reconstructed video. PSNR is a well known measure for the quality of a video, it measures the how well the reconstructed video matches with the original video. The higher the PSNR is, the better the quality of the reconstructed video. As is shown in FIG. 12, the PSNR (the quality of the reconstructed) progressively increases with the number of measurements correctly received. This demonstrates the video encoding and decoding of the present invention is scalable with the channel capacity.

The reconstruction process described above may provide high quality reconstruction, and accurate reconstructed video data with a relatively high PSNR, as shown in FIG. 12. Also, embodiments of the present invention may have a higher error resilience, increased compression ratio, faster reconstruction, and lower complexity than the traditional methods described in the background of the disclosure.

Variations of the example embodiments of the present invention are not to be regarded as a departure from the spirit and scope of the example embodiments of the invention, and all such variations as would be apparent to one skilled in the art are intended to be included within the scope of this invention.

What is claimed:
1. A method for encoding video data by an encoder, the method including:
receiving, by the encoder, the video data including frames;
determining, by the encoder, at least one temporal structure based on a series of consecutive frames in the video data, the at least one temporal structure including a sub-block of video data from each frame in the series, wherein each frame in the series is divided into a plurality of blocks, wherein the sub-block of video data from each frame in the series corresponds to one of the respective plurality of blocks;
obtaining, by the encoder, a measurement matrix corresponding to spatial and temporal variations of the video data within the at least one temporal structure, the measurement matrix including a set of measurement bases having pixel values of a particular type; and
generating, by the encoder, a set of measurements by applying the measurement matrix to the at least one temporal structure, the set of measurements being coded data representing the at least one temporal structure.
2. The method of claim 1, wherein the determining the at least one temporal structure includes:
extracting, by the encoder, the sub-block of video data from a same location in each of the frames in the series; and forming, by the encoder, the at least one temporal structure based on the extracted sub-blocks.

3. The method of claim 1, wherein the determining the at least one temporal structure includes:
   extracting, by the encoder, the sub-block of video data from a different location in at least one of the frames in the series; and
   forming, by the encoder, the at least one temporal structure based on the extracted sub-blocks, wherein the extracted sub-blocks represents a motion trajectory of an object.

4. The method of claim 1, wherein each measurement basis in the set of measurement bases has a same determined the at least one temporal structure of the video data.

5. The method of claim 1, wherein the measurement matrix is a randomly permuted Walsh-Hadamard matrix.

6. The method of claim 1, wherein the generating the set of measurements includes:
   scanning, by the encoder, pixels of the at least one temporal structure to obtain a one-dimensional (1-D) vector, the 1-D vector including pixel values of the at least one temporal structure; and
   multiplying, by the encoder, the 1-D vector by each column of the measurement matrix to generate the set of measurements.

7. The method of claim 6, wherein a 1-D length of the vector is based on a number of horizontal and vertical pixels in one frame and the number of consecutive frames in the series.

8. A method for decoding at least one measurement from a set of measurements into reconstructed video data, wherein the set of measurements represents video data including a series of consecutive frames by a decoder, the method including:
   receiving, by the decoder, the at least one measurement from the set of measurements;
   obtaining, by the decoder, a measurement matrix, corresponding to spatial and temporal variations of the video data within at least one temporal structure based on the series of consecutive frames in the video data, that was applied to the video data at an encoder, the measurement matrix including a set of measurement bases having pixel values of a particular type;
   determining, by the decoder, candidate video data, the candidate video data being based on the measurement matrix and the received at least one measurement,
   determining, by the decoder, discrete cosine transform (DCT) coefficients of the candidate video data by applying a DCT transform in the temporal direction, and
   determining, by the decoder, the reconstructed video data by performing a total variation (TV) of the coefficients on a frame-by-frame basis.

9. The method of claim 8, wherein the TV is one of anisotropic TV and isotropic TV.

10. The method of claim 8, wherein the determining the reconstructed video data further includes:
    calculating, by the decoder, a one-dimensional (1-D) representation of the reconstructed video data according to a minimization of the TV of the DCT coefficients.

11. The method of claim 10, wherein the determining the reconstructed video data further includes:
    determining, by the decoder, the frames of the reconstructed video data based on the 1-D representation of the reconstructed video data.

12. The method of claim 10, wherein the determining the reconstructed video data further includes:
    forming, by the decoder, the at least one temporal structure based on the 1-D representation of the reconstructed video data, the at least one temporal structure including a sub-block of video data from each of the frames in the video data; and
    determining, by the decoder, the reconstructed video data based on the at least one temporal structure.

13. The method of claim 8, wherein each measurement basis of the set of measurement bases has a temporal structure with pixel values of a random pattern.

14. The method of claim 8, wherein the measurement matrix is a randomly permuted Walsh-Hadamard matrix.

15. An apparatus for encoding video data, the apparatus including:
    an encoder configured to receive the video data including frames,
    the encoder configured to determine at least one temporal structure based on a series of consecutive frames in the video data, the at least one temporal structure including a sub-block of video data from each of the frames in the series, wherein each frame in the series is divided into a plurality of blocks, wherein the sub-block of video data from each frame in the series corresponds to one of the respective plurality of blocks,
    the encoder configured to obtain a measurement matrix corresponding to spatial and temporal variations of the video data within the at least one temporal structure, the measurement matrix including a set of measurement bases having pixel values of a particular type, and
    the encoder configured to generate a set of measurements by applying the measurement matrix to the at least one temporal structure, the set of measurements being coded data representing the at least one temporal structure.

16. The apparatus of claim 15, wherein the encoder extracts the sub-block of video data from a same location in each of the frames in the series and forms the at least one temporal structure based on the extracted sub-blocks.

17. The apparatus of claim 15, wherein the encoder extracts the sub-block of video data from a different location in at least one of the frames in the series and forms the at least one temporal structure based on the extracted sub-blocks, wherein the extracted sub-blocks represents a motion trajectory of an object.

18. The apparatus of claim 15, wherein each measurement basis in the set of measurement bases has a same the at least one temporal structure as the video data.

19. The apparatus of claim 15, wherein the measurement matrix is a randomly permuted Walsh-Hadamard matrix.

20. The apparatus of claim 15, further comprising:
    the encoder configured to scan pixels of the at least one temporal structure to obtain a one-dimensional (1-D) vector, the 1-D vector including pixel values of the at least one temporal structure, and
    the encoder configured to multiply the 1-D vector by each column of the Measurement matrix to generate the set of measurements.

21. The apparatus of claim 20, wherein a 1-D length of the vector is based on a number of horizontal and vertical pixels in one frame and the number of consecutive frames in the series.

22. An apparatus for decoding at least one measurement from a set of measurements into reconstructed video data, wherein the set of measurements represents video data including a series of consecutive frames, the apparatus including:
    a decoder configured to receive the at least one measurement from the set of measurements,
    the decoder configured to obtain a measurement matrix, corresponding to spatial and temporal variations of the video data within at least one temporal structure based on the series of consecutive frames in the video data, that was applied to the video data at an encoder, the measurement matrix including a set of measurement bases having pixel values of a particular type, the decoder configured to determine candidate video data, the candidate video data being based on the measurement matrix and the received at least one measurement, the decoder configured to determine discrete cosine transform (DCT) coefficients of the candidate video data by applying a DCT transform in the temporal direction, and the decoder configured to determine the reconstructed video data by performing a total variation (TV) of the coefficients on a frame-by-frame basis.

23. The apparatus of claim 22, wherein the TV is one of anisotropic TV and isotropic TV.

24. The apparatus of claim 22, further including:

the decoder configured to calculate a one-dimensional (1-D) representation of the reconstructed video data according to a minimization of the TV of the DCT coefficients.

25. The apparatus of claim 24, further including:

the decoder configured to determine the frames of the reconstructed video data based on the 1-D representation of the reconstructed video data.

26. The apparatus of claim 24, further including:

the decoder configured to form the at least one temporal structure based on the 1-D representation of the reconstructed video data, the at least one temporal structure including a sub-block of video data from each of the frames in the video data, and the decoder configured to determine the reconstructed video data based on the at least one temporal structure.

27. The apparatus of claim 22, wherein each measurement basis of the set of measurement bases has a temporal structure with pixel values of a random pattern.

28. The apparatus of claim 22, wherein the measurement matrix is a randomly permutated Walsh-Hadamard matrix.

* * * * *